Jan. 6, 1970  L. E. JOHNSON  3,487,658
FISHING REEL DRIVE

Filed Feb. 12, 1968  2 Sheets-Sheet 1

INVENTOR
LLOYD E. JOHNSON
BY
Carlsen, Carlsen, Sturm & Fish
ATTORNEYS

Jan. 6, 1970 L. E. JOHNSON 3,487,658
FISHING REEL DRIVE
Filed Feb. 12, 1968 2 Sheets-Sheet 2
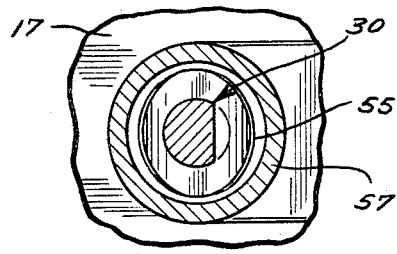
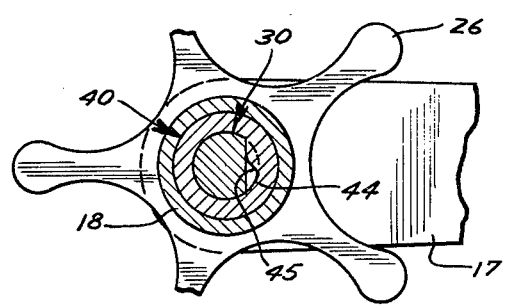
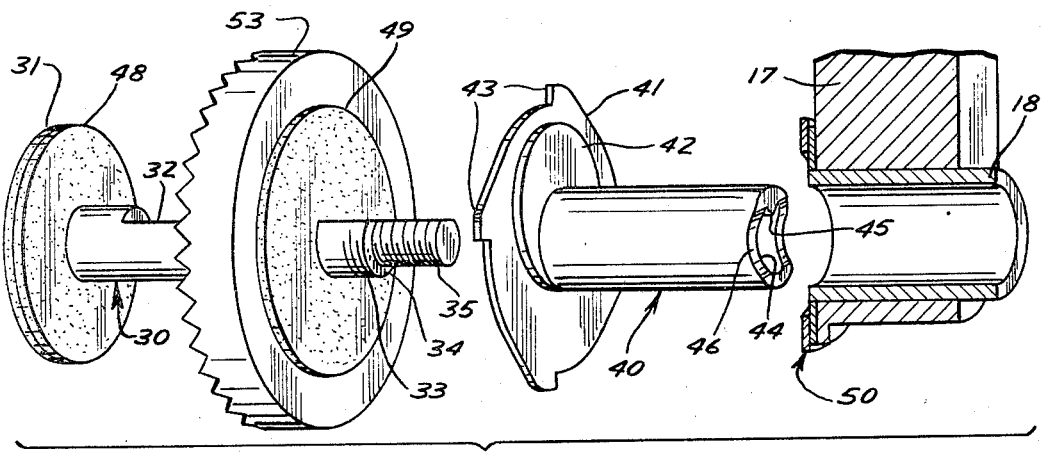
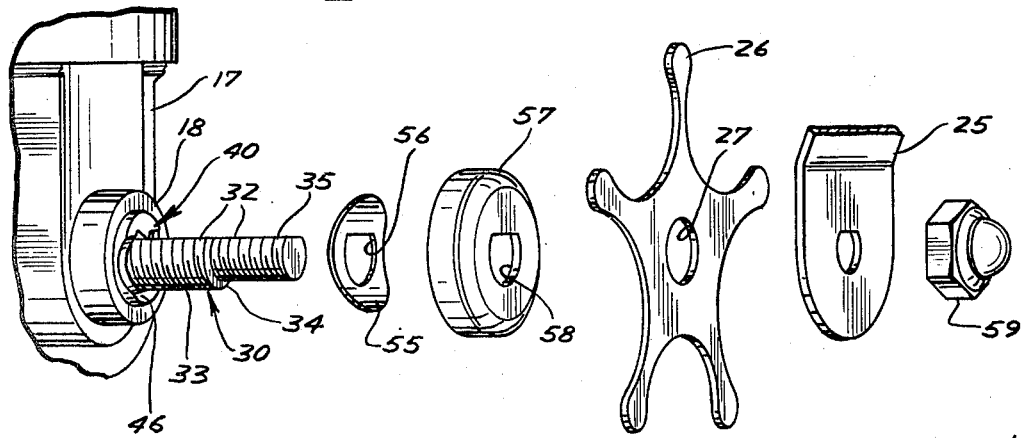
INVENTOR.
LLOYD E. JOHNSON
BY
ATTORNEYS United States Patent Office 3,487,658
Patented Jan. 6, 1970

1

3,487,658
FISHING REEL DRIVE
Lloyd E. Johnson, Mankato, Minn., assignor to Denison-Johnson, Inc., Mankato, Minn., a corporation of Minnesota
Filed Feb. 12, 1968, Ser. No. 704,645
Int. Cl. F16d 7/02
U.S. Cl. 64—30                    9 Claims

ABSTRACT OF THE DISCLOSURE

A driving mechanism for a fishing reel embodying a frictional coupling, or clutch for connecting a crank handle to a line spool. A driven element is disposed between the enlarged inner ends of a pair of concentric shaft members which are provided at their outer ends with a position responsive biasing means for effecting an axially directed tension intermediate the two shaft members to thereby produce a frictional coupling with the driven gear member. Limited relative rotation of the shaft members, one with respect to the other, cooperates with an axially directed camming surface on the outer end of one of the shaft members and a biasing means disposed intermediate the outer ends of the shaft members so that at one relative radial position of the shaft members, the axial tension intermediate the shaft members is of one value and, upon relative rotation of the shaft members to a second radial position, the axial tension intermediate the shaft members is increased or decreased to a different value. This provides, for example, an increased tension when power is applied to the shaft members for reeling in the line onto a fishing reel and a decrease in the tension to allow controlled removal, or unreeling of the line from the reel. The biasing means may be made adjustably variable in nature to provide for a range of operation at the discretion of an operator.

This invention relates generally to fishing reels and is more particularly related to drive mechanisms for fishing reels of the class wherein a line spooling member, or reel, is to be driven, or allowed to rotate, through a driving apparatus that includes a clutch or other form of frictional engagement in one or more portions of the driving apparatus.

As one example of the prior art apparatus to which my invention pertains, the Nurmse Patent No. 2,896,874 is illustrative of a general form of driving mechanism for fishing reels in which apparatus utilizing frictional engagement, such as a clutch means, is disposed intermediate a driving member such as a crank handle and the line spooling member of a fishing reel. This and many other forms of driving mechanisms, including the class illustrated in the Johnson Patent No. 3,232,554, have been utilized at one time or another in the prior art to control the reeling in, or spooling, and the reeling out, or unspooling of line from a fishing reel.

Broadly, it is desirable to provide a mechanism which may be utilized to effect a greater force on a line when it is being reeled in than when the line is allowed to unreel as, for example, when a fish is on the line and a drag on the movements of the fish is unreeling the line is desired. The forms of prior art apparatus known to exist have proven to be complicated, expensive and difficult to fabricate, unworkable in actual use or difficult and unwieldy to operate and maintain in workable condition.

Briefly, my invention may be seen to be comprised of first and second shaft members, each having enlarged inner ends that are axially, slidably displaceable. A first shaft member is provided with a longitudinally extending flatted portion and the second shaft member is hollow

2 and is concentrically, rotatably and axially slidably disposed on the first shaft member. One of the shaft members is provided with an axially extending camming surface at its outer end which is engaged by a resilient biasing means that is in turn attached to the other of the shaft members so that upon relative rotation therebetween, the axial force exerted by the biasing means is varied so that a driven member, such as a gear, disposed intermediate the enlarged inner ends of the shaft members, may be variably frictionally driven when the shaft members are rotated in a suitable bearing therefor.

It is therefore an object of my invention to provide an improved fishing reel drive apparatus.

Another object of my invention is to provide an improved fishing reel drive apparatus that includes a direction of motion responsive frictional coupling element.

A still further object of my invention is to provide an improved fishing reel drive apparatus having an adjustably variable multiple position driven element for spooling and allowing the unspooling of line in a fishing reel.

These and other objects of my invention will become apparent from a consideration of the appended specification, claims and drawings, in which—

FIG. 4 is a sectional view of a portion of FIG. 3 taken along section lines 4—4;

FIG. 5 is a partial sectional view of a portion of FIG. 3 taken along section lines 5—5; and FIGS. 6 and 7 are a fragmentary exploded view, partly in section, showing the elements of a preferred embodiment of my invention as embodied in FIGS. 1-5.

Figure 1:
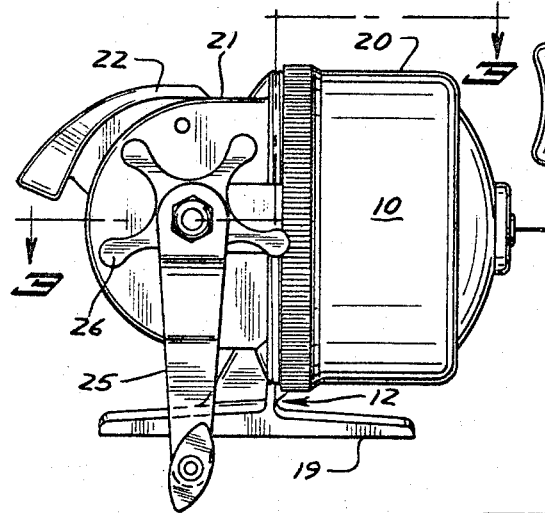
FIG. 1 is a side elevational view of a fishing reel embodying the principles of my invention.
Figure 2:
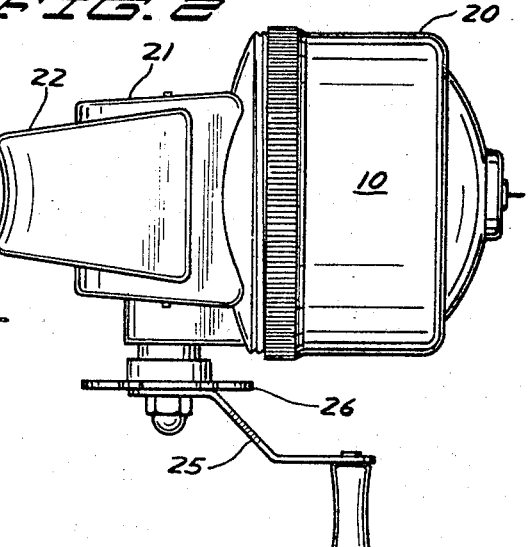
FIG. 2 is a top view of the fishing reel shown in FIG. 1.

Referring to FIGS. 1 and 2 of the drawings, there is shown, as an illustrative example, a fishing reel of the class known as closed face spinning reels 10, such reels generally include a frame 12 having a face plate member 13 which is provided at its center with a bearing member 14 which in turn journals a driven shaft 15 that is axially slidably disposed therein and which carries a line spooling member 24 at its forward end adjacent to and surrounding a line spool 16. Frame 12 also includes a rear portion 17 having a bearing member 18 disposed substantially parallel to face plate 13 and at right angles to the axis of bearing member 14 therein. Frame 12 also includes a suitable downwardly dependent mounting tang 19 that may be disposed in a suitable bracket on a fishing rod. Fishing reel 10 also includes a front cover 20 and a rear cover 21 in which a control lever 22 is suitably disposed. Front and rear cover members 20 and 21 are suitably threaded to retain the same in operative disposition over frame 12. A crank handle 25 and a star wheel drag adjusting member, for purposes to be set forth below, are shown in operative disposition on fishing reel 10.

Figure 3:
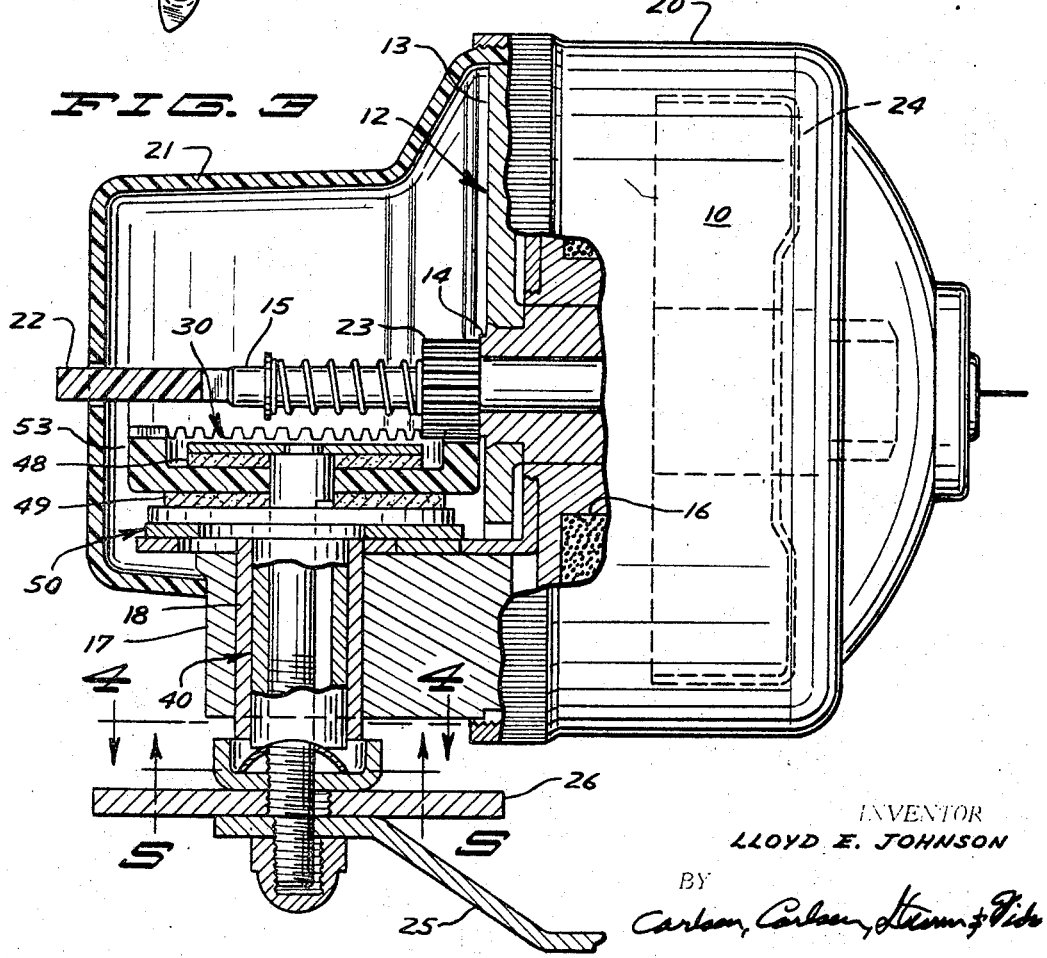
FIG. 3 is an enlarged view of the fishing reel shown in FIGS. 1 and 2 shown partly in section.

In describing my invention, it may be appreciated that much of the information conveyed by and shown in FIGS. 1, 2 and 3 is common to many forms of fishing reels now in existence and for this reason, the discussion set forth below will omit references to certain portions of the complete reel except as may be necessary for a consideration of my invention. It may further be convenient, for an understanding of the line spooling and unspooling function of the illustrative embodiment, to refer to my U.S. Patent No. 2,828,088 and further, with respect to the level wind and spool mounting features, to my U.S. Patent No. 3,154,264. It may also be understood, that, for the purposes of explaining my invention, a driving gear member 53 is considered as the driven member and that the pinion gear 23 on shaft 15 with which it drivingly engages, could also be the spooling member itself or the reel in other forms of fishing mechanisms.

Referring now to FIGS. 3, 4, 5, 6 and 7 of the drawings, there is shown a first shaft member 30, shown in the form of a solid crank shaft which is provided with an enlarged inner end 31, a flatted portion 32 extending outwardly to the outer end thereof, a threaded intermediate portion 33, terminating in a shoulder 34 in proximity to the outer end, and a further threaded portion 35 of reduced radius extending outwardly to the outer end of first shaft 30.

A second shaft member 40 is shown in the form of a hollow shaft concentrically disposed on first shaft member 30 and, includes an enlarged inner end 41, a cam 42 disposed on the enlarged inner end 41, and a plurality of dogs 43 disposed on the outer circumferetial periphery of enlarged inner end 41. Second shaft member 40 further includes a bore 44 that is adapted to be rotatably and slidably disposed on the intermediate portion of shaft member 30 and which includes a radially inwardly extending key portion 45 which is adapted to cooperate with the flatted portion 32 on first shaft member 30 to permit restricted relative rotation between the first and second shaft members. The outer end of second shaft member 40 is provided with an axially extending cam 46.

A driven member shown in the form of a gear 53, is rotatably disposed on first shaft member 30 intermediate the enlarged ends 31 and 41 of shaft members 30 and 40 and a pair of friction producing members shown in the form of drag washers 48 and 49. Drag washers 48 and 49 may be comprised of any suitable friction producing material, for example, asbestos compounds, plastic or metallic substances.

A biasing means shown in the form of a resilient cup-shaped washer 55 having a keyed hole 56 at the approximate center thereof which will permit biasing means 55 to be slidably disposed on threaded portion 33 of first shaft member 30 is disposed adjacent the axial cam 46 on the outer end of second shaft member 40 and is retained in position by a cup washer 57 that is also provided wih a centrally disposed keyed hole 58 to provide slidable disposition on threaded portion 33 of first shaft member 30.

A star wheel drag adjusting member 26 is shown provided with a centrally disposed threaded hole 27 for engagement with threaded portion 33 on first shaft member 30. Crank handle 25, also having a suitably shaped keyed hole is shown nonrotatably disposed on threaded portion 35 at the outer end of first shaft member 30 and is held in abutting engagement with shoulder 34 on shaft 30 through the use of suitable threaded fastening member shown in the form of a nut 59.

An anti-reverse mechanism 50, of the general form shown in my U.S. Patent No. 3,154,264, is indicated generally by reference character 50 and provides the function of restricting second shaft member 40 from rotation in a reverse direction which, in the illustrative embodiment, would be anti-clockwise, through the use of a suitable ratchet that may engage dogs 43 on enlarged end 41 of second shaft member 40.

OPERATION

Assuming the elements of my invention as described immediately above, are in the relative disposition shown in FIGS. 3-7 of the drawings, the axially directed force intermediate enlarged end portions on the inner ends of shaft members 30 and 40 will provide a frictional engagement with driven member 53 of a first predetermined magnitude as dependent upon the axial compression of biasing means 55 as determined by the position of cup washer 57 and star wheel 26 on the threaded portion 33 of shaft member 30. Assuming there is no tension on the line emanating from line spool 16, rotation of the crank handle in a clockwise direction will result in spooling of the line upon line spool 16 in the usual manner. However, should there be a resistance exerted on the line, rotation of crank handle 25 in a clockwise direction will result in relative rotation or displacement of shaft member 30 with respect to shaft member 40 whereby biasing means 55 will also rotate and be cammed in an axially outward direction toward the outermost extended portions of camming surface 46 on the outer end of shaft member 40 to thereby increase the axially directed force and increase the frictional engagement of driven member 53 to a second higher magnitude which, dependent upon the relative position of star wheel 26 on threaded portion 33 of shaft member 30, may be sufficient to overcome the resistive force applied to the line and allow continuous reeling in of the line unto line spool 16.

Should the resistive force, in an outward direction, on the line exceed the frictional force of the drive at the second higher level, relative rotation of driven member 53 in a reverse or anti-clockwise direction will be such as to provide relative rotation between shaft members 30 and 40 to effect a displacement to the position shown in the figures of the drawings with a resulting decrease in the frictional engagement of driven member 53 to allow unreeling of the line through a lower frictional retarding force. This may be effected either by maintaining the crank handle in one position or, as illustrated in the drawings, providing an anti-reverse mechanism, as indicated generally by reference character 50, which will prevent anti-clockwise rotation of shaft member 40 so that relative anti-clockwise rotation of driven member 53 will provide the operation just discussed.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In apparatus of the class above described, first and second concentric shaft members rotatably journaled in a bearing means therefor and having enlarged inner ends axially displaced, said first shaft member having axially extending camming means on the outer end thereof;
    (a) driven means rotatably disposed in engagement with, and intermediate said enlarged inner ends;
    (b) means, including axially resilient biasing means, nonrotatably disposed on the outer end of said second shaft member and in engagement with the camming means on said first shaft member; and
    (c) means permitting limited relative rotation of said first shaft member with respect to said second shaft member, whereby upon relative rotation of said shaft members said biasing means is operative to vary the frictional engagement of said driven means.

2. The apparatus of claim 1 in which driving means are connected to one of said shaft members.

3. The apparatus of claim 1 in which means are provided for restricting bidirectional rotation of one of the shaft members.

4. The apparatus of claim 3 in which driving means are connected to said one of the shaft members.

5. In apparatus of the class above described, the combination comprising;
    (a) bearing means;
    (b) a hollow crank shaft member rotatably disposed in said bearing means;
    (c) a further shaft member rotatably disposed concentrically within said hollow crank shaft;
    (d) means, disposed intermediate said shaft members, for permitting limited relative rotation between said hollow and further shaft members;
    (e) a driven member rotatably disposed on the inner end of said further shaft;
    (f) driving means nonrotatably disposed on the outer end of one of said shaft members,
    (g) a camming surface on the outer end of one of said shaft members and means, including resilient biasing means, adjustably disposed on the outer end of the other of said shaft members, said camming surface being operable upon relative rotation of said shaft members to axially vary the frictional engagement of said driven member, said shaft members also including means for frictionally engaging said driven member intermediate the inner ends thereof and said means adjustably disposed on the outer end of the other of the shaft members being operative to further adjustably, variably control the frictional engagement of said driven member.

6. The apparatus of claim 5 in which the camming surface is on the outer end of the hollow shaft member and the means adjustably disposed is on the further shaft member.

7. The apparatus of claim 6 in which the biasing means in the means adjustably disposed is nonrotatably mounted on the further shaft member.

8. The apparatus of claim 5 in which the camming surface on one of the shaft members is axially symmetrical and the resilient biasing means, in the means adjustably disposed on the other of the shaft members, is similarly axially symmetrical and is nonrotatably disposed on said other of said shaft members.

9. The apparatus of claim 5 in which said one of said shaft members is the hollow shaft member.

References Cited

UNITED STATES PATENTS

| | | | |
|---|---|---|---|
| 2,360,488 | 10/1944 | Garman | 64—30 |
| 2,568,245 | 9/1951 | McDonald. | |
| 2,646,934 | 7/1953 | Hirsch | 64—30 XR |
| 2,777,645 | 11/1957 | Wood | 64—30 XR |
| 3,025,020 | 3/1962 | Sarah | 64—30 XR |

HALL C. COE, Primary Examiner